United States Patent
Hao et al.

(10) Patent No.: US 10,480,551 B2
(45) Date of Patent: Nov. 19, 2019

(54) TRACTION CONTROL SYSTEM FOR ELECTRIC MULTIPLE UNITS

(71) Applicant: CRRC QINGDAO SIFANG ROLLING STOCK RESEARCH INSTITUTE CO., LTD., Qingdao (CN)

(72) Inventors: Baolei Hao, Qingdao (CN); Changjun Gao, Qingdao (CN); Mingxing Wang, Qingdao (CN); Feng Miao, Qingdao (CN); Lei Cui, Qingdao (CN); Xiaowei Zhang, Qingdao (CN); Yuguo Niu, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 338 days.

(21) Appl. No.: 15/507,724

(22) PCT Filed: May 16, 2016

(86) PCT No.: PCT/CN2016/082181
§ 371 (c)(1),
(2) Date: Feb. 28, 2017

(87) PCT Pub. No.: WO2017/008568
PCT Pub. Date: Jan. 19, 2017

(65) Prior Publication Data
US 2017/0292544 A1    Oct. 12, 2017

(30) Foreign Application Priority Data

Jul. 13, 2015 (CN) ......................... 2015 1 0407615
Jul. 13, 2015 (CN) ......................... 2015 1 0408669

(Continued)

(51) Int. Cl.
*F15B 21/044* (2019.01)
*F15B 21/04* (2019.01)
(Continued)

(52) U.S. Cl.
CPC ........... *F15B 21/04* (2013.01); *F01M 13/022* (2013.01); *F01M 13/023* (2013.01);
(Continued)

(58) Field of Classification Search
CPC .......... F15B 21/04; F15B 21/044; F15B 1/26; F15B 13/0814; F02M 26/20; F02M 26/21;
(Continued)

(56) References Cited

U.S. PATENT DOCUMENTS 1,639,670 A * 8/1927 Rydner ................. F16H 57/027
55/419
2,098,666 A * 11/1937 La Brie ................. B60T 13/248
188/106 P
(Continued)

FOREIGN PATENT DOCUMENTS

CN    2718327 Y    8/2005
CN    1741916 A    3/2006
(Continued)

OTHER PUBLICATIONS

International Search Report of corresponding International PCT Application No. PCT/CN2016/082181, dated Aug. 23, 2016.
(Continued)

*Primary Examiner* — Craig J Price
(74) *Attorney, Agent, or Firm* — J.C. Patents

(57) ABSTRACT

The present invention relates to an oil tank ventilation device for a hydraulic brake unit of a tramcar, comprising a vent plug, a sealing ring, a gas guide hole and a gas guide pipe; the gas guide hole is a through-hole structure arranged
(Continued)

at an upper end inside an integrated valve block; the communications of electrical element protection case, integrated valve block and the oil tank are realized by the gas guide pipe stretched into an air chamber of the oil tank and by the vent plug configured in the electrical element protection case. When the surface of the oil tank is covered with ice or snow, the rain or snow can be effectively prevent from falling on the vent plug body and the driving safety of the train is ensured.

18 Claims, 9 Drawing Sheets

(30) Foreign Application Priority Data

| Jul. 13, 2015 | (CN) | 2015 2 0503819 U |
| Jul. 13, 2015 | (CN) | 2015 2 0504202 U |

(51) Int. Cl.
| F02M 26/20 | (2016.01) |
| F02M 26/21 | (2016.01) |
| F01M 13/02 | (2006.01) |
| F16H 57/027 | (2012.01) |
| F15B 1/26 | (2006.01) |
| B60T 17/06 | (2006.01) |
| B01D 19/00 | (2006.01) |
| F16K 24/00 | (2006.01) |
| F15B 13/08 | (2006.01) |
| B60T 17/00 | (2006.01) |
| F02M 26/38 | (2016.01) |
| F02M 26/40 | (2016.01) |
| F02M 26/59 | (2016.01) |

(52) U.S. Cl.
CPC ............ *F02M 26/20* (2016.02); *F02M 26/21* (2016.02); *F16H 57/027* (2013.01); *B01D 19/0042* (2013.01); *B60T 17/002* (2013.01); *B60T 17/06* (2013.01); *F02M 26/38* (2016.02); *F02M 26/40* (2016.02); *F02M 26/59* (2016.02); *F15B 1/26* (2013.01); *F15B 13/0814* (2013.01); *F15B 21/044* (2013.01); *F16K 24/00* (2013.01)

(58) Field of Classification Search
CPC ........ F02M 26/38; F02M 26/40; F02M 26/59; B01D 19/0042; B60T 17/002; B60T 17/06; F01M 13/022; F01M 13/023; F16H 57/027; F16K 24/00; Y10T 137/3084; Y10T 137/3003; Y10T 137/87885; H02B 1/28; H02B 1/30; H05K 5/0213
USPC ........................................ 137/197, 171, 884
See application file for complete search history.

(56) References Cited

U.S. PATENT DOCUMENTS

| 2,635,784 | A | * | 4/1953 | Bering | B65D 51/1616 220/373 |
| 4,151,761 | A | * | 5/1979 | Nishikawa | F16H 57/027 74/606 A |
| 5,303,842 | A | | 4/1994 | Harp et al. | 220/562 |
| 5,348,570 | A | * | 9/1994 | Ruppert, Jr. | B01D 19/0031 55/502 |
| 5,668,349 | A | * | 9/1997 | Durham | H02B 1/28 174/17 VA |
| 5,724,864 | A | * | 3/1998 | Rodgers | F16H 57/027 74/606 R |
| 6,147,298 | A | * | 11/2000 | Mina | H05K 5/0213 174/17 VA |
| 6,318,401 | B1 | * | 11/2001 | Cheng | B66F 5/04 137/197 |
| 6,447,565 | B1 | * | 9/2002 | Raszkowski | F16H 57/027 220/371 |
| 7,626,129 | B2 | * | 12/2009 | Sasaki | H05K 5/068 174/17 VA |
| 8,430,114 | B2 | * | 4/2013 | Welch | F16H 57/027 137/197 |
| 8,944,091 | B2 | * | 2/2015 | Sakraschinsky | F16H 57/027 123/41.86 |
| 9,121,626 | B2 | * | 9/2015 | Uemura | F24F 13/28 |
| 9,217,456 | B2 | * | 12/2015 | Wang | F16B 35/06 |
| 9,650,926 | B2 | * | 5/2017 | Kistner | F16H 57/027 |
| 9,853,425 | B2 | * | 12/2017 | Strom | H02B 1/28 |
| 2003/0010151 | A1 | * | 1/2003 | Johnson | F16H 57/027 74/606 R |
| 2012/0048871 | A1 | * | 3/2012 | Chiu | H05K 5/0213 220/745 |
| 2012/0168453 | A1 | * | 7/2012 | Chiu | H05K 5/0213 220/745 |
| 2013/0032437 | A1 | * | 2/2013 | Akin | B60T 17/08 188/106 F |
| 2014/0116550 | A1 | | 5/2014 | Hu et al. | 137/625.46 |

FOREIGN PATENT DOCUMENTS

| CN | 201416625 Y | 3/2010 | |
| CN | 201729219 U | 2/2011 | |
| CN | 201779237 U | 3/2011 | |
| CN | 203670707 U | 6/2014 | |
| CN | 105003493 A | 10/2015 | |
| CN | 105041785 A | 11/2015 | |
| CN | 204739037 U | 11/2015 | |
| CN | 204783968 U | 11/2015 | |
| DE | 44 15 784 A1 | 11/1994 | |
| DE | 20 2006 007 789 U1 | 10/2006 | |
| DE | 102006015263 A1 * | 10/2007 | F16K 24/00 |
| JP | 2010-105670 A | 5/2010 | |

OTHER PUBLICATIONS

Chinese First Search Report of corresponding Chinese patent Application No. 201510408669.9, dated May 13, 2016.
Chinese First Search Report of corresponding Chinese patent Application No. 201510407615.0, dated Jul. 20, 2016.

\* cited by examiner

TRACTION CONTROL SYSTEM FOR ELECTRIC MULTIPLE UNITS

CROSS-REFERENCE TO RELATED APPLICATION

This application is a national phase application of international application No. PCT/CN2016/082181 filed on May 16, 2016, which in turn claims the priority benefits of Chinese application No. 201510408669.9, filed on Jul. 13, 2015, Chinese application No. 201520503819.X, filed on Jul. 13, 2015, Chinese application No. 201510407615.0, filed on Jul. 13, 2015, and Chinese application No. 201520504202.X, filed on Jul. 13, 2015. The contents of these prior applications are hereby incorporated by reference in its entirety.

TECHNICAL FIELD

The present invention relates to the technical field of rail vehicle brake, and in particular to an oil tank ventilation device for a hydraulic brake unit of a tramcar.

BACKGROUND OF THE PRESENT INVENTION

For modern tramcars, due to their low-floor structure, the mounting space for a brake system is limited, thus a brake pressure is generally provided by a highly integrated valve-block type hydraulic unit.

FIG. 1 shows a composition diagram of a prior tramcar hydraulic brake unit, including an electrical element protection case 1, an integrated valve block 2, an oil tank 3, a vent plug 4, etc. Since the normal operation of a hydraulic pump and other elements inside the oil tank 3 can be ensured only if the oil tank 3 is communicated with the atmosphere smoothly, the vent plug 4 is generally mounted in a mounting hole on the upper surface of the oil tank 3. The mounting hole is a through-hole for ensuring the communication of the inner chamber of the oil tank with the atmosphere. The vent plug 4 is somewhat hydrophobic, and in general cases, can ensure the communication of oil liquid in the oil tank 3 with the atmosphere and prevent water vapor from getting into the oil tank 3.

In high-latitude areas, it is often rainy, snowy and frozen in the winter. Since the hydraulic unit is mounted on the bottom of a tramcar and very close to the ground surface, the surface of the vent plug 4 will be covered with snow, and the accumulated snow will be molten by heat generated during the operation of the elements inside the hydraulic unit, so that a lot of water will be accumulated on the surface of the vent plug 4. Consequently, the ventilation performance of the oil tank 3 will be influenced, or even the accumulated water will be suck into the oil tank 3 through the vent plug 4 under the action of a negative pressure, thereby influencing the operation of the hydraulic brake system and threatening the driving safety.

The prior art (CN20367070U) discloses a waterproof vent plug for a speed reducer and a speed reducer with the same, comprising a vent pipe, a connecting pipe and a cover, wherein the vent pipe is cup-shaped and has a peripheral wall and a bottom wall, on both of which at least one vent hole is provided to realize the ventilation of the inside of a housing and the outside, referring to FIG. 2. The vent plug can prevent water vapor from getting into the inside of the housing of the speed reducer, and avoid the degradation of lubrication effect caused by the increased content of water in the lubricating oil. However, the cover plate, the connecting pipe and the vent pipe are mounted on the vent plug structure successively from top to bottom, and the air flow path is of an unidirectional and longitudinal structure. Thus, when the surface of the oil tank is covered with ice or snow, it is still likely to result in the poor ventilation and the rain or snow penetration after the vent plug is covered with rain or snow, so that the driving safety of a train is affected.

SUMMARY OF THE PRESENT INVENTION

An objective of the present invention is to provide an oil tank ventilation device for a hydraulic brake unit of a tramcar, in which a vent plug is disposed inside an electrical element protection case so that rain is prevent from falling into the oil tank while ensuring the smooth ventilation of the oil tank with the outside.

The technical solutions of the present invention: an oil tank ventilation device for a hydraulic brake unit of a tramcar, comprising a vent plug, a sealing ring, a gas guide hole and a gas guide pipe, wherein the gas guide hole is a through-hole structure arranged at an upper end inside an integrated valve block; the vent plug is arranged inside an electrical element protection case, and performs gas exchange with the outside through a harness hole provided on the electrical element protection case; the vent plug is mounted in the gas guide hole on the integrated valve block which is on one side of the interior of the electrical element protection case, and the vent plug is coaxial with the gas guide hole and is communicated with an inner chamber of the integrated valve block through the gas guide hole; the sealing ring is mounted at a junction of the vent plug and the integrated valve block; and, one end of the gas guide pipe is mounted with the gas guide hole on the integrated valve block which is on one side of the interior of the oil tank, while another end thereof is stretched into an air chamber above the interior of the oil tank, and the gas guide pipe is coaxial and communicated with the gas guide hole.

The above gas guide hole is obtained by digging a passageway inside the integrated valve block. The ventilation device provided by the present invention comprises a vent plug, a sealing ring, a gas guide hole which is a through hole near the upper end of the integrated block, and a gas guide pipe. Here, it can be considered that the vent plug is communicated with the inner chamber of the integrated valve block through the gas guide hole. In addition, the gas guide hole can be replaced with other pipe (referred to as vent pipe hereinafter) in an existing passageway of the integrated valve block. In other words, a passageway is formed at the upper end of the integrated valve block, and a vent pipe is provided in the passageway.

The gas guide hole or the vent pipe realizes the communication of the electrical element protection case, the integrated valve block and the oil tank. The communication between the oil tank and the outside air can be realized by the gas guide pipe stretched into the air chamber inside the oil tank and the vent plug arranged inside the electrical element protection case.

Further, to ensure the smoothness of communication of the vent plug with the outside air, the structure of the vent plug comprises a vent plug body and a waterproof vent assembly. There is at least one waterproof vent assembly mounted on a side or sides of the vent plug body. Preferably, there are two waterproof vent assemblies which are symmetrically mounted on sides of the vent plug body.

For the vent plug, by symmetrically or asymmetrically mounting the waterproof vent assemblies on the sides of the vent plug body, the ventilation of the oil tank is realized by the waterproof vent assemblies. When there is a need of replacement, it is required to replace only the waterproof vent assemblies rather than detaching the whole vent plug from the oil tank, so that it is convenient for maintenance and replacement. When the surface of the oil tank is covered with ice or snow, the vent surfaces of the waterproof vent assemblies will not be covered with rain or snow since the vent plug is internally disposed inside the electrical element protection case and the waterproof vent assemblies are mounted on the sides of the vent plug body, so that the rain or snow can be effectively prevent from falling thereon and the driving safety of the train is ensured.

Further, when there is one waterproof vent assembly, the vent plug body comprises a mounting fastener, a transverse vent hole, a waterproof vent assembly mounting groove and a main mounting thread portion; a plurality of opposite clamping faces are provided on sides of the mounting fastener, and the waterproof vent assembly mounting groove is mounted on one clamping face of the mounting fastener; the transverse vent hole is provided at a junction of the waterproof vent assembly mounting groove and the waterproof vent assembly and extends toward the interior of the mounting fastener; the waterproof vent assembly is mounted at the transverse vent hole; and, a longitudinal vent hole is provided at an axle center of the main mounting thread portion, the longitudinal vent hole is perpendicular to and communicated with the transverse vent hole, and the longitudinal vent hole, the transverse vent hole and the oil tank together form a vent plug gas flow passageway.

Further, when there are two or more waterproof vent assemblies, the vent plug body comprises a mounting fastener, transverse vent holes, waterproof vent assembly mounting grooves and a main mounting thread portion; a plurality of opposite clamping faces are provided on sides of the mounting fastener, and the waterproof vent assembly mounting grooves are provided on the opposite clamping faces of the mounting fastener; the transverse vent holes are provided at junctions of the waterproof assembly mounting grooves and the waterproof vent assemblies, and the transverse vent holes transversely run through other waterproof vent assembly mounting grooves; the waterproof vent assemblies are mounted at the transverse vent holes, and the waterproof vent assemblies are communicated with each other through the transverse vent holes; and, a longitudinal vent hole is provided at an axle center of the main mounting thread portion, the longitudinal vent hole is perpendicular to and communicated with the transverse vent holes, and the longitudinal vent hole, the transverse vent holes and the oil tank together form a vent plug gas flow passageway.

For the vent plug, by symmetrically or asymmetrically mounting one or more waterproof vent assemblies on sides of the vent plug body, communicating the waterproof vent assemblies with each other through transverse vent holes, providing a longitudinal vent hole communicated with the oil tank at the axle center of the main mounting thread portion, and communicating the longitudinal vent hole with the oil tank directly, the longitudinal vent hole, the transverse vent holes and the oil tank together form a vent plug gas flow passageway since the longitudinal vent hole is perpendicular to and communicated with the transverse vent holes, that is, the gas flow path of the vent plug is formed by the communication of a transverse passageway with a longitudinal passageway, so that the air permeability of the vent plug is greatly improved.

Further, the waterproof vent assembly is shaped like a bolt with a vent window provided on its head portion and a vent hole provided on its rod portion, the vent window is connected to the vent hole, and the vent hole is communicated with the transverse vent hole. The vent window is preferably provided on a side of the head portion.

Further, the waterproof vent assembly comprises a cover plate, a waterproof breathable membrane, an assembly body and a small sealing ring; one end of the assembly body is mounted in the transverse vent hole at the waterproof vent assembly mounting groove by means of threads; the small sealing ring is mounted between the assembly body and the waterproof vent assembly mounting groove; the cover plate is mounted on an outer side of the assembly body; and, the waterproof breathable membrane is mounted between the assembly body and the cover plate.

Further, the assembly body comprises a vent hole, cover plate mounting pores, a vent window, an assembly fastener and an assembly mounting thread portion; the assembly fastener is of a hollow structure, and one vent window exchanging air with the outside is cut in the middle of the upper end of each clamping face of the assembly fastener; one end of the assembly fastener close to the waterproof vent assembly mounting groove is the assembly mounting thread portion, and the assembly mounting thread portion is mounted in the transverse through hole via the small sealing ring; a vent hole communicating the assembly fastener with the assembly mounting thread portion is provided at an axle center of the assembly fastener and the assembly mounting thread portion; a waterproof breathable membrane mounting stair for mounting the waterproof breathable membrane is provided on an inner wall of the assembly fastener; the axis of the assembly body, the axis of the vent hole, the axis of the waterproof breathable membrane mounting stair, and the axis of the assembly fastener and the assembly mounting thread portion are overlapped with each other; an outer edge of the cover plate and an outer edge of the assembly body are consistent in structural size; the cover plate comprises a cover plate body and mounting pins, with the cover plate body being of a multi-prism structure consistent with the assembly fastener; there are several mounting pins which are uniformly distributed on the bottom of the cover plate body close to one side of the assembly body, and the positions of the mounting pins are in one-to-one correspondence to the positions of the cover plate mounting pores; and, during the assembly, the mounting pins are inserted into the cover plate mounting pores, and the assembly body is closely fitted to the cover plate.

Further, the waterproof vent assembly mounting groove is a semicircular groove with an upper end aligned with the upper end of the mounting fastener and a lower end of an arc structure.

Further, the vent plug body is provided with a main sealing ring mounting groove for mounting the sealing ring, and the main sealing ring mounting groove is provided at a junction of the main mounting thread portion and the mounting fastener. This structure can effectively ensure the circulation of gas.

Further, the gas guide pipe is a stainless hollow straight pipe, and one end of the gas guide pipe is mounted on one side of the oil tank close to the integrated valve block.

A working process is as follows: gas in the oil tank passes through the gas guide pipe on the upper portion of the inner chamber of the oil tank, and the gas guide hole or the vent pipe in the integrated valve block, then enters the vent plug, subsequently enters the harness hole on the electrical element protection case, and finally exchanges with outside gas via the harness hole. Specifically, the gas in the oil tank passes through the gas guide pipe on the upper portion of the inner chamber of the oil tank, and the gas guide hole or the vent pipe in the integrated valve block, then enters the vent plug and goes through the longitudinal vent hole and transverse vent holes in the vent plug, subsequently enters the vent hole of the waterproof vent assembly, enters the harness hole on the electrical element protection case through the vent windows, and finally exchanges with outside gas via the harness hole.

in which: 1 electrical element protection case; 101 harness hole; 2 integrated valve block; 201 upper end; 202 inner chamber; 3 oil tank; 4 vent plug; 5 sealing ring; 6 gas guide hole; 7 gas guide pipe; 41 vent plug body; 42 waterproof vent assembly; 4201 head portion; 4202 rod portion; 411 mounting fastener; 4111 upper end of the mounting fastener; 412 transverse vent hole; 413 waterproof vent assembly mounting groove; 4131 upper end of the groove; 4132 lower end of the groove; 414 main mounting thread portion; 415 longitudinal vent hole; 416 main sealing ring mounting groove; 417 waterproof vent assembly mounting thread portion; 408 clamping face; 421 cover plate; 4211 cover plate body; 4213 outer edge of the cover plate; 4212 mounting pin; 422 waterproof breathable membrane; 423 assembly body; 4231 vent hole; 4232 cover plate mounting hole; 4233 vent window; 4234 waterproof breathable membrane mounting stair; 4235 assembly fastener; 42351 inner wall of the assembly fastener; 4236 assembly mounting thread portion; 424 small sealing ring; 4237 outer side of the assembly body; 4238 outer edge of the assembly body; 8 passageway; 9 vent pipe.

DETAILED DESCRIPTION OF THE PRESENT INVENTION

Figure 1:
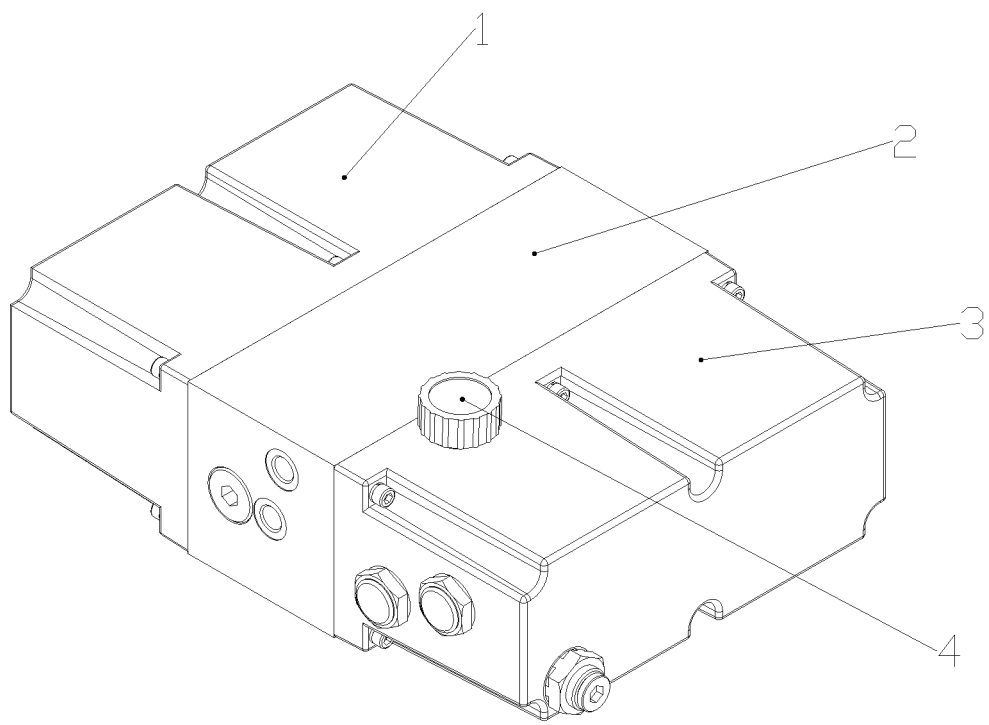
FIG. 1 is a structural diagram of a prior hydraulic brake unit for a tramcar.
Figure 2:
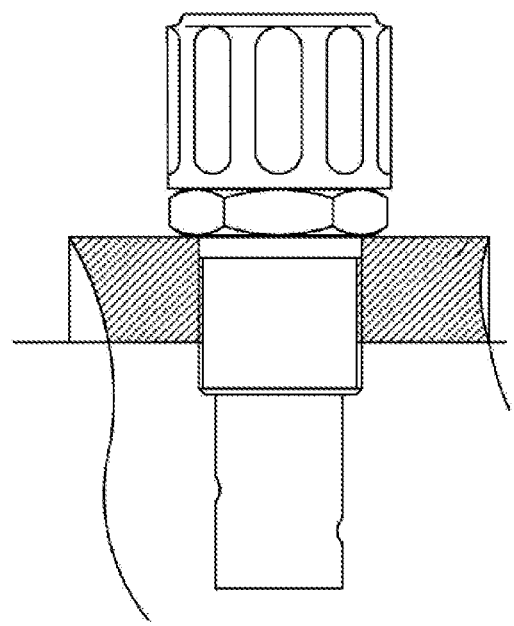
FIG. 2 is a structural diagram of a prior waterproof vent plug.

To make the objectives, technical solutions and advantages of the present invention clearer, the technical solutions in embodiments of the present invention will be clearly and completely described below with reference to the accompanying drawings of the present invention, in which FIG. 1 and FIG. 2 show the prior art, and the descriptions of FIG. 1 and FIG. 2 have been embodied in the background and will not be repeated here. Apparently, the embodiments described herein are merely part but not all of embodiments of the present invention. All other embodiments (e.g., replacements of the conventional technical means, etc.) obtained by those skilled in the art based on the embodiments in the present invention without paying any creative effort shall fall into the protection scope of the present invention.

Embodiment 1

Figure 3:
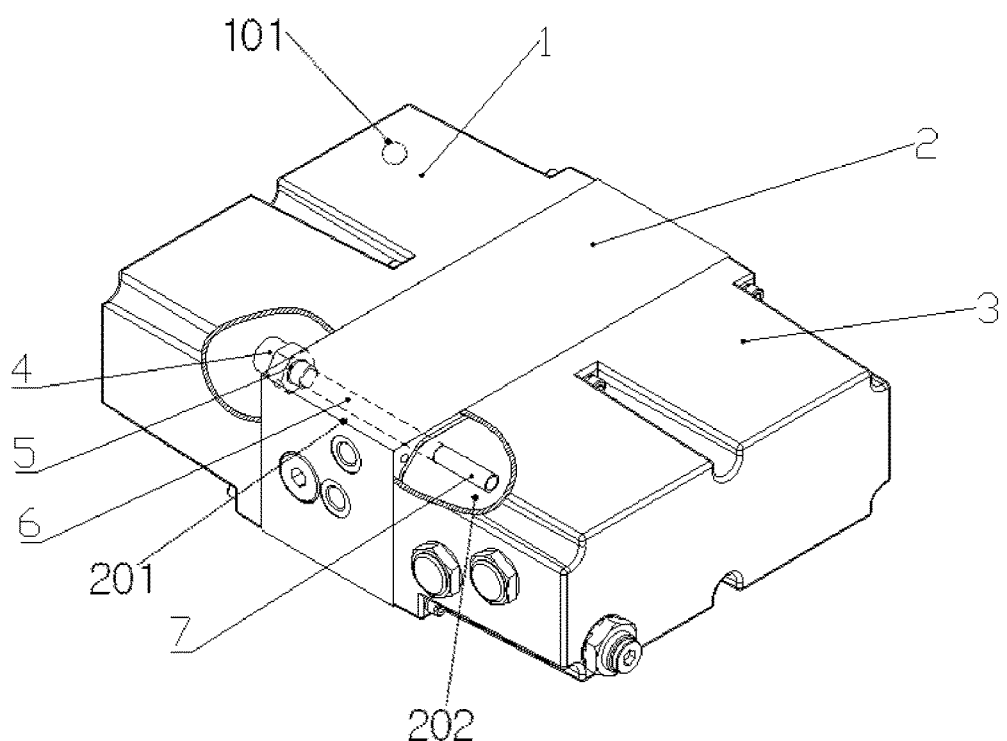
FIG. 3 is a structural diagram of a hydraulic brake unit according to the present invention.

As shown in FIG. 3, the hydraulic brake unit for a tramcar provided by the present invention comprises an electrical element protection case 1, an integrated valve block 2 and an oil tank 3, wherein the electrical element protection case 1 is mounted on one side of the oil tank 3, the integrated valve block 2 is mounted between the electrical element protection case 1 and the oil tank 3, and a harness hole (not shown) is provided in the electrical element protection case 1.

In the oil tank ventilation device for a hydraulic brake unit of a tramcar disclosed by the present invention, a vent plug 4 is internally provided inside the electrical element protection case 1, so that the rain is prevent from falling into the oil tank 3 while ensuring the smooth ventilation of the oil tank 3 with the outside. A specific structure of the ventilation device is that the ventilation device comprises a vent plug 4, a sealing ring 5, a gas guide hole 6 and a gas guide pipe 7.

The gas guide hole 6 is a through-hole structure arranged at an upper end inside the integrated valve block 2. That is, the gas guide hole 6 is a through hole formed inside the integrated valve block 2, and this realizes the communication of an inner chamber of the electrical element protection case 1 with an inner chamber of the oil tank 3. The gas guide hole 6 is inside the integrated valve block 2, and will not interfere with other oil paths inside the integrated valve block 2.

The vent plug 4 is provided inside the electrical element protection case 1, and performs gas exchange with the outside via the harness hole in the electrical element protection case 1. By internally arranging the vent plug 4, gas exchange with the outside may be performed via the harness hole, without influencing the smoothness of gas exchange of the oil tank. Moreover, due to the covering effect of the electrical element protection case 1, rain may be prevented from directly falling into the oil tank. The vent plug 4 is mounted in the gas guide hole 6 on the integrated valve block 2 by manes of threads, while the integrated valve block 2 is on one side of the interior of the electrical element protection case 1, and the vent plug 4 is coaxial with the gas guide hole 6 and communicated with the inner chamber of the integrated valve block 2 through the gas guide hole 6. The sealing ring 5 is mounted at a junction of the vent plug 4 and the integrated valve block 2. One end of the gas guide pipe 7 is mounted in the gas guide hole 6 on the integrated valve block 2 inside the oil tank 3, while the other end thereof is inserted into an air chamber above the interior of the oil tank 3. The gas guide pipe 7 is coaxial and communicated with the gas guide hole 6.

Embodiment 2

Expect for the following technical features, the remaining features are the same as Embodiment 1.

A passageway is formed on an upper side of the interior of the integrated valve block 2, and a vent pipe (not shown) is provided inside the passageway. The diameter of the passageway is greater than that of the vent pipe, so that it is convenient to mount the vent pipe inside the passageway.

In this embodiment, the gas guide pipe 6 in Embodiment 1 is replaced by the vent pipe. The vent pipe is connected to and coaxial with the vent plug 4. One end of the gas guide pipe 7 is mounted on the vent pipe, while the other end thereof is inserted into an air chamber above the interior of the oil tank 3. The gas guide pipe 7 is coaxial and communicated with the vent pipe.

Differences between Embodiment 1 and Embodiment 2 lie in that the gas guide hole 6 in Embodiment 1 is integrated inside the integrated valve block 1, that is, the gas guide hole 6 is a passageway formed inside the integrated valve block; while in Embodiment 2, a passageway is first formed inside the integrated valve block 2, and then a pipe (vent pipe) is provided inside the passageway. In this case, the vent pipe plays the same role as the gas guide hole 6 in Embodiment 1. It is to be noted that, to prevent the substance in the oil tank 3 from diffusion through the passageway, a sealing device should be provided for processing an annular portion which is formed between the passageway and the vent pipe, for example, adopting a sealing ring.

Embodiment 2 has the following advantages in comparison with Embodiment 1: the vent pipeline (gas guide hole 6) in Embodiment 1 is fixed and integrated; however, in Embodiment 2, the passageway inside the integrated valve block 2 may be preset to be larger, and accordingly, for the vent pipeline (vent pipe) provided inside the integrated valve block 2, the size of the vent pipe may be changed according to the ventilation volume under the premise of ensuring a diameter smaller than that of the passageway; moreover, if the vent pipeline is blocked, the vent pipe is directly replaced in Embodiment 2, and it is thus more convenient than cleaning the integrated vent pipeline (gas guide hole 6) as in Embodiment 1.

Embodiment 3

Figure 4:
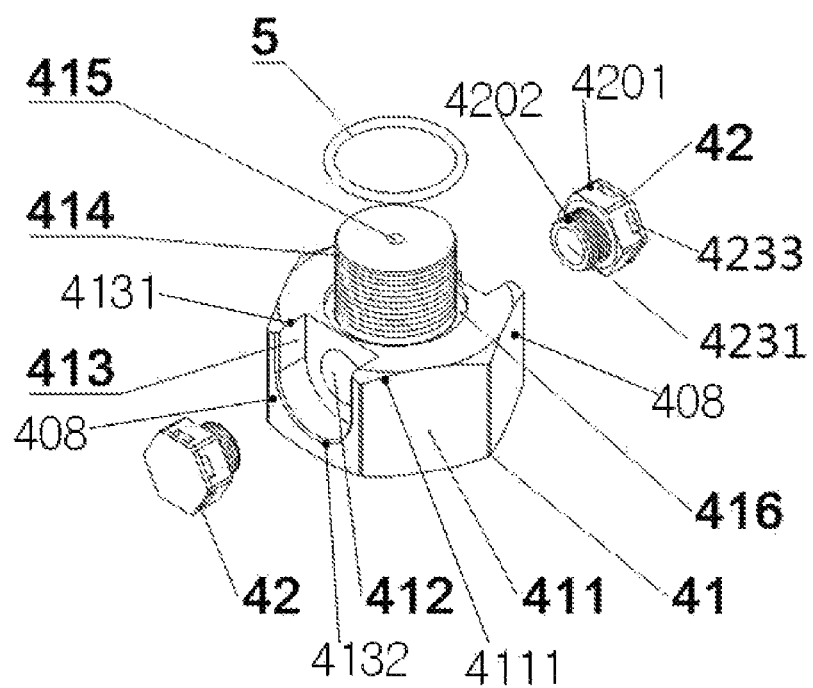
FIG. 4 is a first structural diagram of a vent plug according to the present invention.

On the basis of Embodiment 1 or Embodiment 2, as shown in FIG. 4, the vent plug 4 comprises a vent plug body 41 and waterproof vent assemblies 42.

As shown in FIG. 4, there are two waterproof vent assemblies 42 which are symmetrically mounted on sides of the vent plug body 41. The waterproof vent assemblies 42 are shaped like bolts. Differences between the waterproof vent assemblies 42 and a bolt lie in that a vent window 4233 is provided on a head portion of the vent plug body 41, and a vent hole 4231 is longitudinally provided on a rod portion; one end of the vent hole 4231 is communicated with the vent window 4233, while another end thereof is communicated with a transverse vent hole 412; and the vent window 4233 is preferably provided on a side of the head portion.

Figure 5:
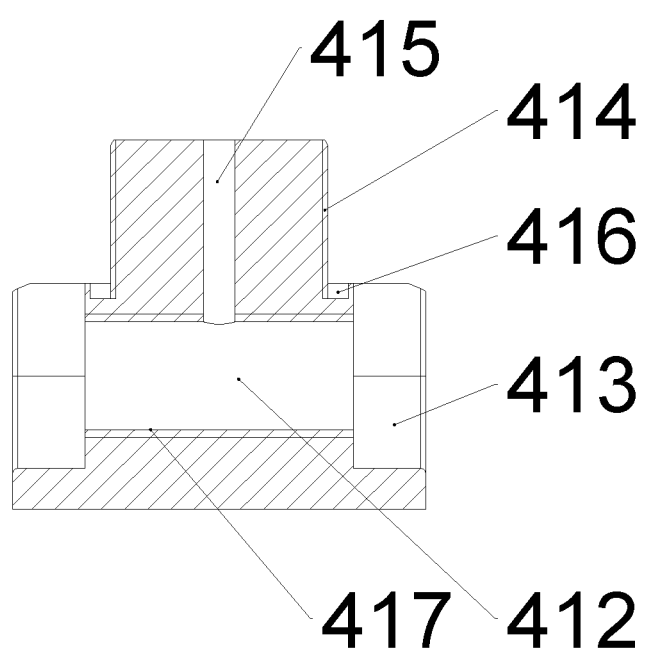
FIG. 5 is a first sectional view of the vent plug according to the present invention.

As shown in FIGS. 4 and 5, the vent plug body 41 comprises a mounting fastener 411, transverse vent holes 412, waterproof vent assembly mounting grooves 413 and a main mounting thread portion 414.

The mounting fastener 411 is of a multi-prism structure. A plurality of opposite clamping faces are provided on sides of the mounting fastener 411, and each of the clamping faces is of a rounded corner structure for ensuring retaining of no dust or rain. The clamping faces are clamped by mounting tools such as a wrench so as to mount the vent plug.

The number of the waterproof vent assembly mounting grooves 413 corresponds to that of the waterproof vent assemblies 42. In this embodiment, there are two waterproof vent assembly mounting grooves for mounting the waterproof vent assemblies 42, and the two waterproof vent assembly mounting grooves 413 are provided on the opposite clamping faces of the mounting fastener 411. Each of the waterproof vent assembly mounting grooves 413 is a semicircular groove with an upper end aligned with the upper end of the mounting fastener 411 and a lower end of an arc structure.

The transverse vent holes 412 are provided at junctions of the waterproof vent assembly mounting grooves 413 and the waterproof vent assemblies 42, and the transverse vent holes 412 transversely run through the opposite waterproof vent assembly mounting grooves 413. A waterproof vent assembly mounting thread portion 417 is provided on an inner wall of each of the transverse vent holes 412, and the waterproof vent assemblies 42 are mounted in the transverse vent holes 412 by means of threads, so that a transverse ventilation of the vent plug is realized. However, the way of connecting the waterproof vent assemblies 42 with the transverse vent holes 412 is not limited to the threaded connection, and other ways capable of avoiding gas leakage may be used.

The main mounting thread portion 414 is located right above the mounting fastener 411. The main mounting thread portion 414 is mounted at an oil tank vent plug mounting port, i.e., connected to the gas guide hole 6 or vent pipe in the foregoing embodiment. A longitudinal vent hole 415 is provided at an axle center of the main mounting thread portion 414. The longitudinal vent hole 415 is perpendicular to and communicated with the transverse vent holes 412. The longitudinal vent hole 415, the transverse vent holes 412 and the oil tank together form a vent plug gas glow passageway, so that the combined action of the three enhances the ventilation effect of the vent plug.

The sealing ring 5 is mounted at a junction of the vent plug 4 and the integrated valve block 2 or mounted at a junction of the vent plug 4 and the vent pipe, and plays a role of sealing. To better ensure the sealing effect of the sealing ring 5, preferably, a main sealing ring mounting groove 416 for mounting the sealing ring 5 is provided at a junction of the main mounting thread portion 414 and the mounting fastener 411 (as shown in FIGS. 4 and 5).

One end of the gas guide pipe 7 is mounted at the gas guide hole 6 on the integrated valve block 2, or mounted on the vent pipe. Preferably, the way of connection is threaded connection. Another end of the gas guide pipe 7 is stretched into an air chamber above the interior of the oil tank 3. The gas guide pipe 7 is coaxial and communicated with the gas guide hole 6 or the vent pipe. The gas guide pipe 7 is preferably a stainless hollow straight pipe, but other corrosion resistant materials may also be used. By stretching the gas guide pipe 7 into the oil tank 3, the backflow of oil liquid caused by the shake of the vehicle may be avoided. Thus, the normal use of the brake unit and the driving safety of the vehicle are ensured while ensuring the ventilation of the oil tank.

Embodiment 4

Figure 6:
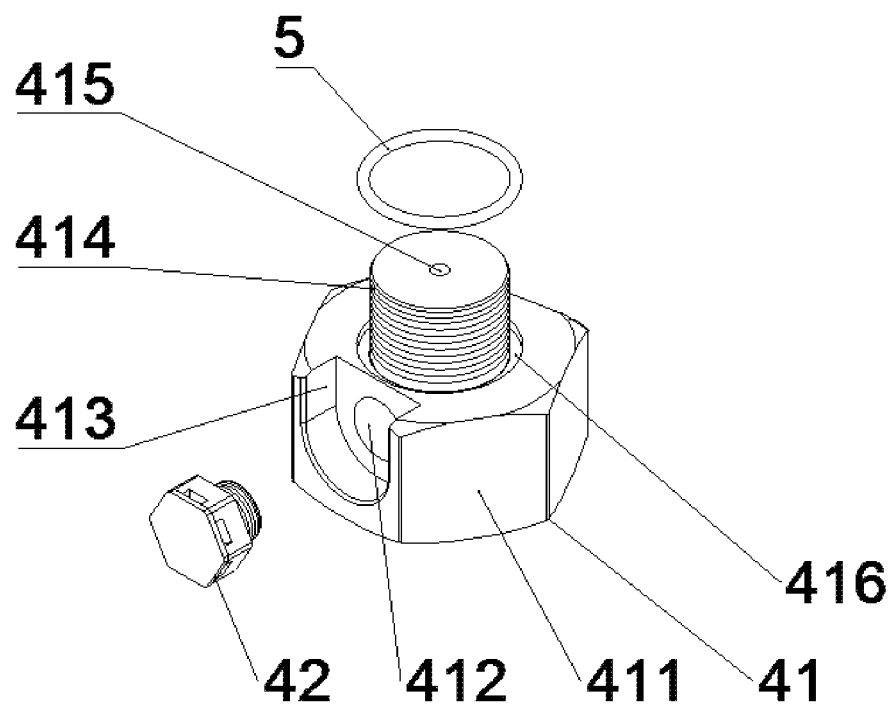
FIG. 6 is a second structural diagram of the vent plug according to the present invention.

On the basis of Embodiment 1 or Embodiment 2, as shown in FIG. 6, the vent plug 4 comprises a vent plug body 41 and a waterproof vent assembly 42.

There is only one waterproof vent assembly having a same structure as the waterproof event assemblies in Embodiment 3.

Figure 7:
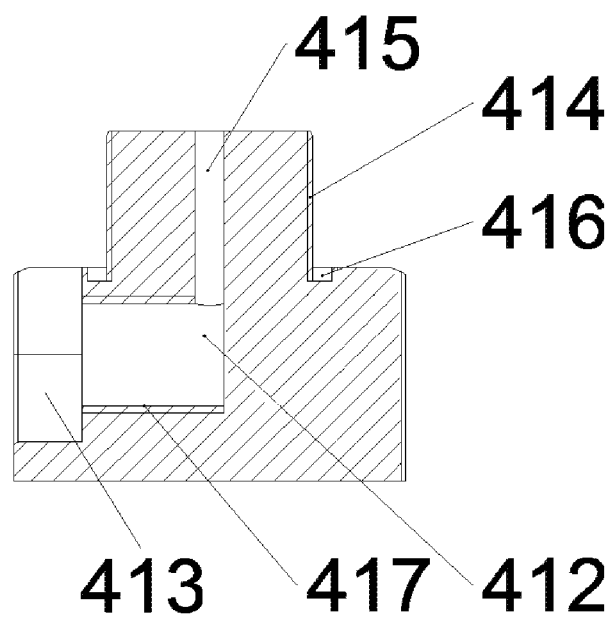
FIG. 7 is a second sectional view of the vent plug according to the present invention.

As shown in FIGS. 6 and 7, the vent plug body 41 comprises a mounting fastener 411, a transverse vent hole 412, a waterproof vent assembly mounting groove 413 and a main mounting thread portion 414.

The mounting fastener 411 is of a multi-prism structure. A plurality of opposite clamping faces are provided on sides of the mounting fastener 411, and each of the clamping faces is of a rounded corner structure for ensuring retaining of no dust or rain. The clamping faces are clamped by mounting tools such as a wrench so as to mount the vent plug.

The number of the waterproof vent assembly mounting groove 413 corresponds to that of the waterproof vent assembly 42. In this embodiment, there is one waterproof vent assembly mounting groove for mounting the waterproof vent assembly 42, and the waterproof vent assembly mounting groove 413 is provided on a clamping face of the mounting fastener 411. The waterproof vent assembly mounting groove 413 is a semicircular groove with an upper end aligned with the upper end of the mounting fastener 411 and a lower end of an arc structure.

The transverse vent hole 412 is provided at a junction of the waterproof vent assembly mounting groove 413 and the waterproof vent assembly 42, and the transverse vent hole 412 transversely extends into but not run through the mounting fastener 411. A waterproof vent assembly mounting thread portion 417 is provided on an inner wall of the transverse vent hole 412, and the waterproof vent assembly 42 is mounted in the transverse vent hole 412 by means of threads. However, way of connecting the waterproof vent assembly 42 with the transverse vent hole 412 is not limited to the threaded connection, and other ways capable of avoiding gas leakage may be used.

The main mounting thread portion 414 is located right above the mounting fastener 411. The main mounting thread portion 414 is mounted at an oil tank vent plug mounting port, i.e., connected to the gas guide hole 6 or vent pipe in the foregoing embodiment. A longitudinal vent hole 415 is provided at an axle center of the main mounting thread portion 414. The longitudinal vent hole 415 is perpendicular to and communicated with the transverse vent hole 412. The longitudinal vent hole 415, the transverse vent hole 412 and the oil tank together form a vent plug gas glow passageway, so that the combined action of the three enhances the ventilation effect of the vent plug.

The sealing ring 5 is mounted at a junction of the vent plug 4 and the integrated valve block 2 or mounted at a junction of the vent plug 4 and the vent pipe, and plays a role of sealing. To better ensure the sealing effect of the sealing ring 5, preferably, a main sealing ring mounting groove 416 for mounting the sealing ring 5 is provided at a junction of the main mounting thread portion 414 and the mounting fastener 411 (as shown in FIGS. 6 and 7).

One end of the gas guide pipe 7 is mounted at the gas guide hole 6 on the integrated valve block 2, or mounted on the vent pipe. The used connection way may be threaded connection. The other end of the gas guide pipe 7 is stretched into an air chamber above the interior of the oil tank 3. The gas guide pipe 7 is coaxial and communicated with the gas guide hole 6 or the vent pipe. The gas guide pipe 7 is preferably a stainless hollow straight pipe, but other corrosion resistant materials may also be used. By stretching the gas guide pipe 7 into the oil tank 3, the backflow of oil liquid caused by the shake of the vehicle may be avoided. Thus, the normal use of the brake unit and the driving safety of the vehicle are ensured while ensuring the ventilation of the oil tank.

Embodiment 5

Expect for the following technical features, the remaining features are the same as that in Embodiment 3.

There may be more than two waterproof vent assemblies 42 as long as the waterproof vent assemblies play a role of ventilation. The number of the waterproof vent assembly mounting grooves 413 is the same as that of the waterproof vent assemblies 42.

Embodiment 6

Figure 8:
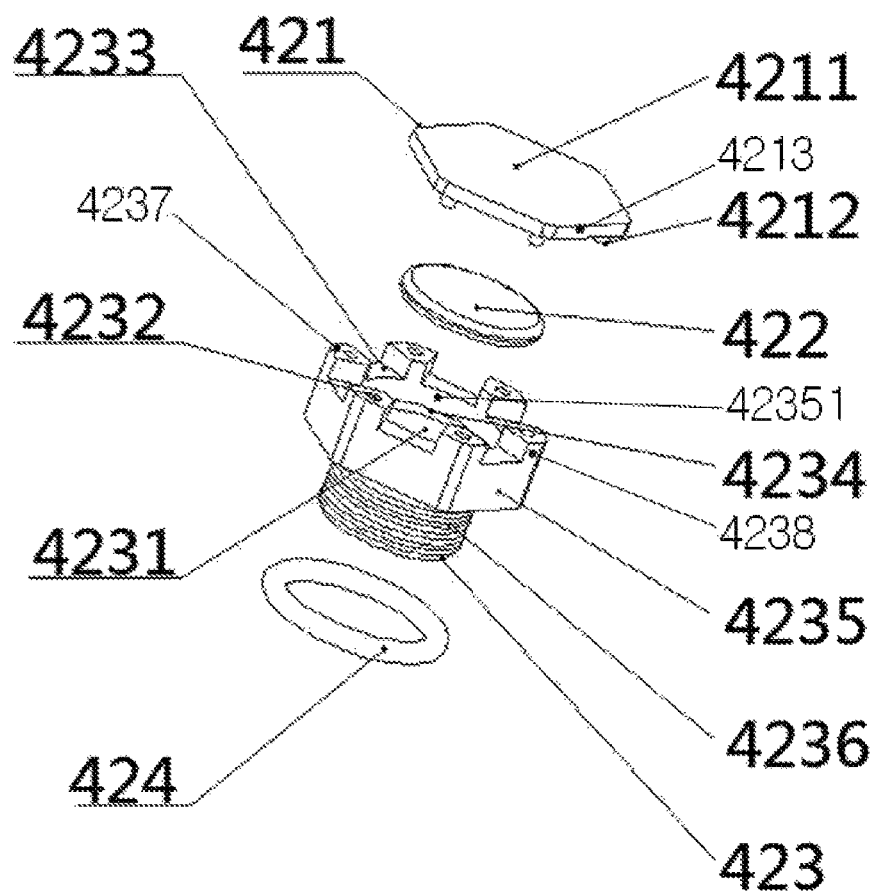
FIG. 8 is an exploded view of a waterproof vent assembly according to the present invention.
Figure 9:
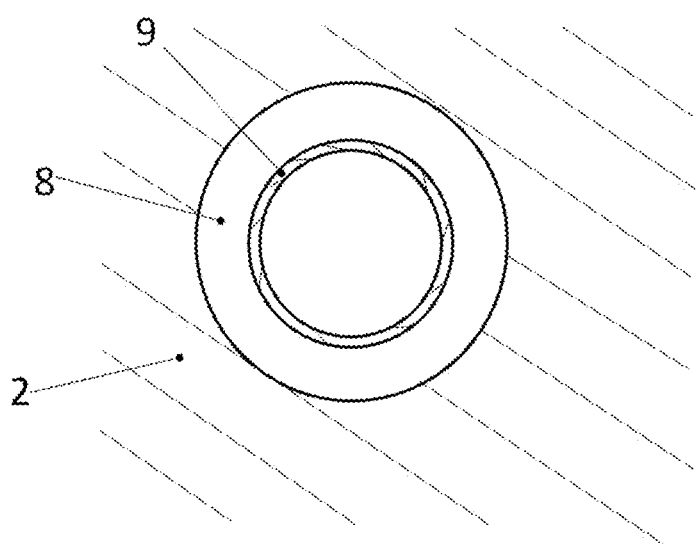
FIG. 9 is a partial sectional view of the passageway and the vent pipe in integrated valve block.

On the basis of Embodiment 3, Embodiment 4 or Embodiment 5, as shown in FIG. 8, a waterproof vent assembly 42 comprises a cover plate 421, a waterproof breathable membrane 422, an assembly body 423 and a small sealing ring 424. One end of the assembly body 423 is mounted with the transverse vent hole 412 of the waterproof vent assembly mounting groove by connection means of threaded or other means. The small sealing ring 424 is mounted between the assembly body 423 and the waterproof vent assembly mounting groove 413. The cover plate 421 is mounted on an outer side of the assembly body 423. The waterproof breathable membrane 422 is mounted between the assembly body 423 and the cover plate 421.

The assembly body 423 comprises a vent hole 4231, cover plate mounting holes 4232, vent windows 4233, an assembly fastener 4235 and an assembly mounting thread portion 4236. The assembly fastener 4235 is of a hollow structure, and one vent window 4233 exchanging air with the outside is cut in the middle of the upper end of each clamping face of the assembly fastener 4235. One end of the assembly fastener 4235 close to the waterproof vent assembly mounting groove 413 is an assembly mounting thread portion 4136, and the assembly mounting thread portion 4236 is mounted in the transverse through hole 412 via the small sealing ring 424. A vent hole 4231 communicating the assembly fastener 4235 with the assembly mounting thread portion 4236 is provided at an axis of the two ones. A waterproof breathable membrane mounting stair 4234 for mounting the waterproof breathable membrane 422 is provided on an inner wall of the assembly fastener 4235. The axis of the assembly body, the axis of the vent hole, the axis of the waterproof breathable membrane mounting stair and the axis of the assembly fastener and the assembly mounting thread portion are overlapped with each other.

An outer edge of the cover plate 421 and an outer edge of the assembly body 423 are consistent in structural size. The cover plate 421 comprises a cover plate body 4211 and mounting pins 4212. The cover plate body 4211 is of a multi-prism structure consistent with the assembly fastener 4235. There are several mounting pins 4212 which are uniformly distributed on the bottom of the cover plate body 4211 close to one side of the assembly body. The positions of the mounting pins 4212 are in one-to-one correspondence to the positions of the cover plate mounting holes 4232. During the assembly, the mounting pins 4212 are inserted into the cover plate mounting pores 4232, and the assembly body 423 is closely fitted to the cover plate 421.

The invention claimed is:

1. An oil tank ventilation device for a hydraulic brake unit of a tramcar, comprising a vent plug, a sealing ring, a gas guide hole and a gas guide pipe; wherein the gas guide hole is a through-hole structure arranged at an upper end inside an integrated valve block; the vent plug is arranged inside an electrical element protection case, and performs gas exchange from an outside through a harness hole provided on the electrical element protection case; the vent plug is mounted in the gas guide hole on the integrated valve block which is on one side of an interior of the electrical element protection case, and the vent plug is coaxial with the gas guide hole and is communicated with an inner chamber of the integrated valve block through the gas guide hole; the sealing ring is mounted at a junction of the vent plug and the integrated valve block; and, one end of the gas guide pipe is mounted with the gas guide hole on the integrated valve block which is on one side of an interior of an oil tank, while another end of the gas guide pipe is stretched into an air chamber above the interior of the oil tank, and the gas guide pipe is coaxial and communicated with the gas guide hole.

2. The oil tank ventilation device according to claim 1, wherein, the vent plug comprises a vent plug body and a waterproof vent assembly; there is at least one waterproof vent assembly mounted on a side or sides of the vent plug body.

3. The oil tank ventilation device according to claim 1, wherein, the gas guide pipe is a stainless hollow straight pipe, and one end of the gas guide pipe is mounted threadingly on the gas guide hole in the integrated valve block.

4. The oil tank ventilation device according to claim 1, wherein, a passageway is formed on an upper side of the interior of the integrated valve block, and a vent pipe is provided inside the passageway; the diameter of the passageway is greater than that of the vent pipe; the gas guide pipe is replaced by the vent pipe.

5. The oil tank ventilation device according to claim 2, wherein, when there is one waterproof vent assembly, the vent plug body comprises a mounting fastener, a transverse vent hole, a waterproof vent assembly mounting groove and a main mounting thread portion; a plurality of opposite clamping faces are provided on sides of the mounting fastener, and the waterproof vent assembly mounting groove is mounted on one clamping face of the mounting fastener; the transverse vent hole is provided at a junction of the waterproof vent assembly mounting groove and the waterproof vent assembly and extends toward an interior of the mounting fastener; the waterproof vent assembly is mounted at the transverse vent hole; and, a longitudinal vent hole is provided at an axle center of the main mounting thread portion, the longitudinal vent hole is perpendicular to and communicated with the transverse vent hole.

6. The oil tank ventilation device according to claim 5, wherein, the waterproof vent assembly is of a bolt shape with a vent window provided on a head portion thereof and a vent hole provided on a rod portion thereof, the vent window is connected to the vent hole, and the vent hole is communicated with the transverse vent hole.

7. The oil tank ventilation device according to claim 5, wherein, the waterproof vent assembly comprises a cover plate, a waterproof breathable membrane, an assembly body and a small sealing ring; one end of the assembly body is mounted in the transverse vent hole at the waterproof vent assembly mounting groove by means of threads; the small sealing ring is mounted between the assembly body and the waterproof vent assembly mounting groove; the cover plate is mounted on an outer side of the assembly body; and, the waterproof breathable membrane is mounted between the assembly body and the cover plate.

8. The oil tank ventilation device according to claim 7, wherein, the assembly body comprises a vent hole, cover plate mounting holes, a vent window, an assembly fastener and an assembly mounting thread portion; the assembly fastener is of a hollow structure, and one vent window exchanging air with outside is cut in middle of an upper end of each clamping face of the assembly fastener; one end of the assembly fastener close to the waterproof vent assembly mounting groove is the assembly mounting thread portion, and an assembly thread mounting portion is mounted in the transverse vent hole via the small sealing ring; a vent hole communicating the assembly fastener with the assembly mounting thread portion is provided at an axle center of the assembly fastener and the assembly mounting thread portion; a waterproof breathable membrane mounting stair for mounting the waterproof breathable membrane is provided on an inner wall of the assembly fastener; an axis of the assembly body, an axis of the vent hole, an axis of the waterproof breathable membrane mounting stair, and an axis of the assembly fastener and the assembly mounting thread portion are overlapped with each other; an outer edge of the cover plate and an outer edge of the assembly body are consistent in structural size; the cover plate comprises a cover plate body and mounting pins, with the cover plate body being of a multi-prism structure consistent with the assembly fastener; there are several mounting pins which are uniformly distributed on a bottom of the cover plate body close to one side of the assembly body, and positions of the mounting pins are in one-to-one correspondence to positions of the cover plate mounting holes; and, during the assembly, the mounting pins are inserted into the cover plate mounting holes, and the assembly body is closely fitted to the cover plate.

9. The oil tank ventilation device according to claim 2, wherein, when there are two or more waterproof vent assemblies, the vent plug body comprises a mounting fastener, transverse vent holes, waterproof vent assembly mounting grooves and a main mounting thread portion; a plurality of opposite clamping faces are provided on sides of the mounting fastener, and the waterproof vent assembly mounting grooves are provided on the opposite clamping faces of the mounting fastener; the transverse vent holes are provided at junctions of the waterproof assembly mounting grooves and the waterproof vent assemblies, and the transverse vent holes transversely run through other waterproof vent assembly mounting grooves; the waterproof vent assemblies are mounted at the transverse vent holes, and the waterproof vent assemblies are communicated with each other through the transverse vent holes; and, a longitudinal vent hole is provided at an axle center of the main mounting thread portion, the longitudinal vent hole is perpendicular to and communicated with the transverse vent holes.

10. The oil tank ventilation device according to claim 9, wherein, the waterproof vent assembly mounting groove is a semicircular groove with an upper end thereof aligned with an upper end of the mounting fastener and a lower end of a groove of an arc structure.

11. The oil tank ventilation device according to claim 9, wherein, the vent plug body is provided with a main sealing ring mounting groove for mounting the sealing ring, and the main sealing ring mounting groove is provided at a junction of the main mounting thread portion and the mounting fastener.

12. The oil tank ventilation device according to claim 9, wherein, the waterproof vent assembly is of a bolt shape with a vent window provided on a head portion thereof and a vent hole provided on a rod portion thereof, the vent window is connected to the vent hole, and the vent hole is communicated with the transverse vent hole.

13. The oil tank ventilation device according to claim 9, wherein, the waterproof vent assembly comprises a cover plate, a waterproof breathable membrane, an assembly body and a small sealing ring; one end of the assembly body is mounted in the transverse vent hole at the waterproof vent assembly mounting groove by means of threads; the small sealing ring is mounted between the assembly body and the waterproof vent assembly mounting groove; the cover plate is mounted on an outer side of the assembly body; and, the waterproof breathable membrane is mounted between the assembly body and the cover plate.

14. The oil tank ventilation device according to claim 13, wherein, the assembly body comprises a vent hole, cover plate mounting holes, a vent window, an assembly fastener and an assembly mounting thread portion; the assembly fastener is of a hollow structure, and one vent window exchanging air with outside is cut in middle of an upper end of each clamping face of the assembly fastener; one end of the assembly fastener close to the waterproof vent assembly mounting groove is the assembly mounting thread portion, and the assembly mounting thread portion is mounted in the transverse vent hole via the small sealing ring; a vent hole communicating the assembly fastener with the assembly mounting thread portion is provided at an axle center of the assembly fastener and the assembly mounting thread portion; a waterproof breathable membrane mounting stair for mounting the waterproof breathable membrane is provided on an inner wall of the assembly fastener; an axis of the assembly body, an axis of the vent hole, an axis of the waterproof breathable membrane mounting stair, and an axis of the assembly fastener and the assembly mounting thread portion are overlapped with each other; an outer edge of the cover plate and an outer edge of the assembly body are consistent in structural size; the cover plate comprises a cover plate body and mounting pins, with the cover plate body being of a multi-prism structure consistent with the assembly fastener; there are several mounting pins which are uniformly distributed on a bottom of the cover plate body close to one side of the assembly body, and positions of the mounting pins are in one-to-one correspondence to positions of the cover plate mounting holes; and, during the assembly, the mounting pins are inserted into the cover plate mounting holes, and the assembly body is closely fitted to the cover plate.

15. The oil tank ventilation device according to claim 5, wherein, the waterproof vent assembly mounting groove is a semicircular groove with an upper end thereof aligned with an upper end of the mounting fastener and a lower end of a groove of an arc structure.

16. The oil tank ventilation device according to claim 5, wherein, the vent plug body is provided with a main sealing ring mounting groove for mounting the sealing ring, and the main sealing ring mounting groove is provided at a junction of the main mounting thread portion and the mounting fastener.

17. The oil tank ventilation device according to claim 2, wherein, the waterproof vent assembly is of a bolt shape with a vent window provided on a head portion thereof and a vent hole provided on a rod portion thereof, the vent window is connected to the vent hole.

18. The oil tank ventilation device according to claim 2, wherein, the gas guide pipe is a stainless hollow straight pipe, and one end of the gas guide pipe is mounted threadingly on the gas guide hole in the integrated valve block.

* * * * *